(12) United States Patent
Crosman, III et al.

(10) Patent No.: US 8,928,260 B2
(45) Date of Patent: Jan. 6, 2015

(54) TRACTION MOTOR RETARDING FLUX REFERENCE

(71) Applicant: Caterpillar Inc., Peoria, IL (US)

(72) Inventors: Alexander Cameron Crosman, III, Dunlap, IL (US); Joshua M. Williams, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 13/655,019

(22) Filed: Oct. 18, 2012

(65) Prior Publication Data

US 2014/0111125 A1    Apr. 24, 2014

(51) Int. Cl.
*H02P 3/00*    (2006.01)

(52) U.S. Cl.
USPC ........... 318/380; 318/382; 318/375; 318/808; 318/86; 318/87; 318/140; 318/143; 318/145; 318/151; 318/152; 318/157; 318/158; 363/125; 363/61; 180/165; 180/65.31

(58) Field of Classification Search
CPC ... B60L 11/1803; B60L 15/00; Y02T 10/642; Y02T 10/70; Y02T 10/7258; B60K 26/00; B60K 7/0007; H02P 25/023
USPC ............. 318/380, 382, 375, 808, 86, 87, 140, 318/143, 145, 151, 152, 157, 158; 363/125, 363/61; 180/165, 65.31
See application file for complete search history.

(56) References Cited

U.S. PATENT DOCUMENTS

| 3,651,388 | A | | 3/1972 | Machin, Jr. et al. |
|---|---|---|---|---|
| 3,743,901 | A | | 7/1973 | Johnson |
| 4,093,900 | A | | 6/1978 | Plunkett |
| 5,480,220 | A | * | 1/1996 | Kumar .......................... 303/151 |
| 5,990,648 | A | * | 11/1999 | Kumar et al. ................. 318/490 |
| 5,992,950 | A | * | 11/1999 | Kumar et al. ................. 303/151 |
| 6,133,700 | A | * | 10/2000 | Kumar ............................ 318/85 |
| 6,152,546 | A | * | 11/2000 | Daigle .......................... 303/151 |
| 6,208,097 | B1 | * | 3/2001 | Reddy et al. .................... 318/52 |
| 6,768,284 | B2 | | 7/2004 | Lee et al. |
| 7,609,024 | B2 | | 10/2009 | Ahmad et al. |
| 7,940,016 | B2 | | 5/2011 | Donnelly et al. |
| 7,944,158 | B2 | | 5/2011 | Jiang et al. |
| 8,054,016 | B2 | | 11/2011 | Gottemoller et al. |
| 2009/0295315 | A1 | | 12/2009 | Tarnow et al. |

FOREIGN PATENT DOCUMENTS

GB    2 040 123 A    8/1980

* cited by examiner

*Primary Examiner* — Rita Leykin
(74) *Attorney, Agent, or Firm* — Miller, Matthias & Hull

(57) ABSTRACT

A traction motor system calculates motor flux by generating a real time effective resistance of a resistance grid calculated from motor torque and measured voltage on a DC link. Calculating effective resistance avoids solely relying on DC link voltage, which can be influenced by conditions such as wheel slip and drop out of one or more resistance grids. The effective resistance calculation is based on nominal motor values using known power levels and conditions. From these nominal values and the effective resistance, various scaling factors based on actual motor power can be generated and used to adjust a nominal flux reference to more accurately reflect actual motor flux. The scaling factors include power and torque scaling factors and a resistance scaling factor that is active during conditions such as wheel slip.

20 Claims, 3 Drawing Sheets

TRACTION MOTOR RETARDING FLUX REFERENCE

TECHNICAL FIELD

The present disclosure generally relates to electric drive motors and particularly to flux estimation in electric drive motors during braking operation.

BACKGROUND

Operation of traction motors, for example, in a railroad locomotive, involves several layers of control for both propel (drive) operation and retard (brake) operation. For example, while an operator may adjust a throttle, an upper level controller may call for acceleration or deceleration, and a lower level controller may adjust torque based on the call for acceleration or deceleration. Even though the relationships are easily calculated in an ideal case, implementation of control at the given levels may require different data related to the drive system operating environment in order to carry out the necessary controls. For example, when managing torque in an AC traction motor, knowledge of motor flux is necessary for properly controlling inverters that set motor voltage and phase. In an ideal condition, DC link (supply) voltage can be used to estimate flux. However, many real world conditions, including wheel slip and resistive grid drop out, contribute to changes in link voltage that can lead to substantial errors in flux calculation.

A typical vehicle AC drive system may include several traction inverters, each driving one or more motors, all connected to a common DC link. When the motors are operated in retarding modes, power is fed from the motors into the DC link and the generated power is commonly dissipated in a resistive grid. The DC link voltage in this mode of operation is related to the total power produced by all inverters/motors as they feed that power into the resistive grid. In general, this means that a higher torque or power produced by one inverter/motor will increase the DC link voltage, however there is not always a one-to-one relationship of each inverter's contribution to the net DC link voltage due a lack of consistency among other inverters that are also connected to the DC link. In order to maintain desired efficiency and torque accuracy, there is a requirement to accurately set the traction motor flux reference in retarding modes of operation. This flux reference can then be used in typical vector-control methods to set current and voltage targets for motor control. Ideally, this flux reference will vary with DC link voltage (among other inputs) in order to maximize the flux and therefore the efficiency.

Typically the flux reference is set based on a measurement of the DC link voltage. Particularly during braking, the flux reference affects quadrature axis current Iq, which in turn affects torque. Torque affects power and power affects DC link voltage. This circular path can lead to oscillations and instability as the reference will necessarily lag behind the measurement, causing differences between the actual flux and the flux reference.

Another approach is to set the flux reference based on the inverter torque reference. In a single-inverter system this will work well, but in a system where multiple inverters can operate at varying power levels on a common DC link the lack of a one-to-one relationship between torque and voltage makes this approach problematic.

It is necessary to develop a flux reference more indirectly so that the lack of information and inherent instability in traditional measurements can be avoided while responding correctly to torque requirements.

SUMMARY OF THE DISCLOSURE

In one aspect of the current disclosure, a method of adjusting electrical power application in a motor control system using an AC motor driven by an inverter bank that is coupled to a resistive grid during retard operation includes calculating a braking factor as a ratio of a nominal power DC voltage vs. a nominal brake DC voltage, calculating a resistance scale factor as a ratio of measured grid resistance vs. a base grid resistance and determining that motor operation is in one of a constant power region or a constant torque region. The method may further include multiplying a DC link voltage, the braking factor, the resistance scale factor and one of a power scale factor when in a constant power region or a torque scale factor when in a constant torque region to generate an adjusted flux estimate and setting inverter operation to adjust motor torque based on the adjusted flux estimate, where the power scale factor is a function of a measured torque times mechanical frequency vs. a characteristic torque times a corner point mechanical frequency and the torque scale factor is a function of the measured torque vs. the characteristic torque.

In another aspect of the current disclosure, another method of operating an AC motor driven by an inverter includes determining a base resistance constant using characteristics of the motor at a first motor rotation frequency, where the first motor rotation frequency defined at a transition point between constant torque operation of the motor and constant power operation of the motor ("the knee frequency." The method may also include calculating motor power as a function of the actual torque and the actual motor rotation frequency, calculating an effective resistance at the inverter as a function of motor power and a voltage on the DC link and calculating an estimated flux reference as a function of the DC link voltage, the effective resistance, and the base resistance constant. The method may also include adjusting torque output of the motor based on the estimated flux reference.

In yet another aspect of the current disclosure, an alternating current (AC) motor system adapted to adjust motor flux based on motor power, a direct current (DC) link voltage, and an effective resistance at an inverter used to drive the AC motor may include an AC generator, a rectifier that converts an output of the generator to DC power, a DC link coupled to the rectifier, a resistive grid selectively coupled to the DC link, A plurality of AC motors and a plurality of inverters, each of the plurality of inverters electrically coupling the DC link to a respective one AC motor of the plurality of AC motors. the system may also include a controller coupled to the DC link, the resistive grid, and each of the plurality of inverters, the controller itself including a processor and a memory that stores instructions that when executed on the processor cause the controller to i) calculate an estimated flux based at least in part on an effective resistance of the grid at each inverter of the plurality of inverters, where the effective resistance is calculated from actual torque, actual motor rotation frequency, the DC link voltage and a base resistance constant and ii) adjust a setting for each inverter of the plurality of inverters that controls a torque of the AC motor associated with each inverter.

DETAILED DESCRIPTION

AC motor drive systems, such as those used in locomotives, use inverters to generate specialized stator waveforms in a direct axis (d current, or Id) and a quadrature axis (q current, or Iq) to control motor torque. When operated in a drive or propel mode energy from a DC link is applied to the motor. When used in a brake or retard mode energy generated by the motor may be dissipated in a resistive grid. In other alternatives, the energy from brake mode operation may be recovered in a battery or capacitor.

Generally, at other than peak drive or brake operation, the inverter effectively isolates its respective motor from the DC link. However, when at maximum power situations, the ratio between DC voltage and motor voltage, known as modulation ratio, is set to its maximum value and the voltage applied to the motor varies directly with the DC link voltage. Correspondingly, motor flux also varies directly with DC link voltage. As result, even though the controller managing the inverter cannot control the flux, it is still necessary to have a good estimate of the actual flux so that the Iq current references are accurate and torque production can be correctly managed.

As discussed in detail below, a flux reference may be developed using a combination of feed-forward and feedback terms based on known characteristics of the motor and measurements available to the controller.

Figure 1:
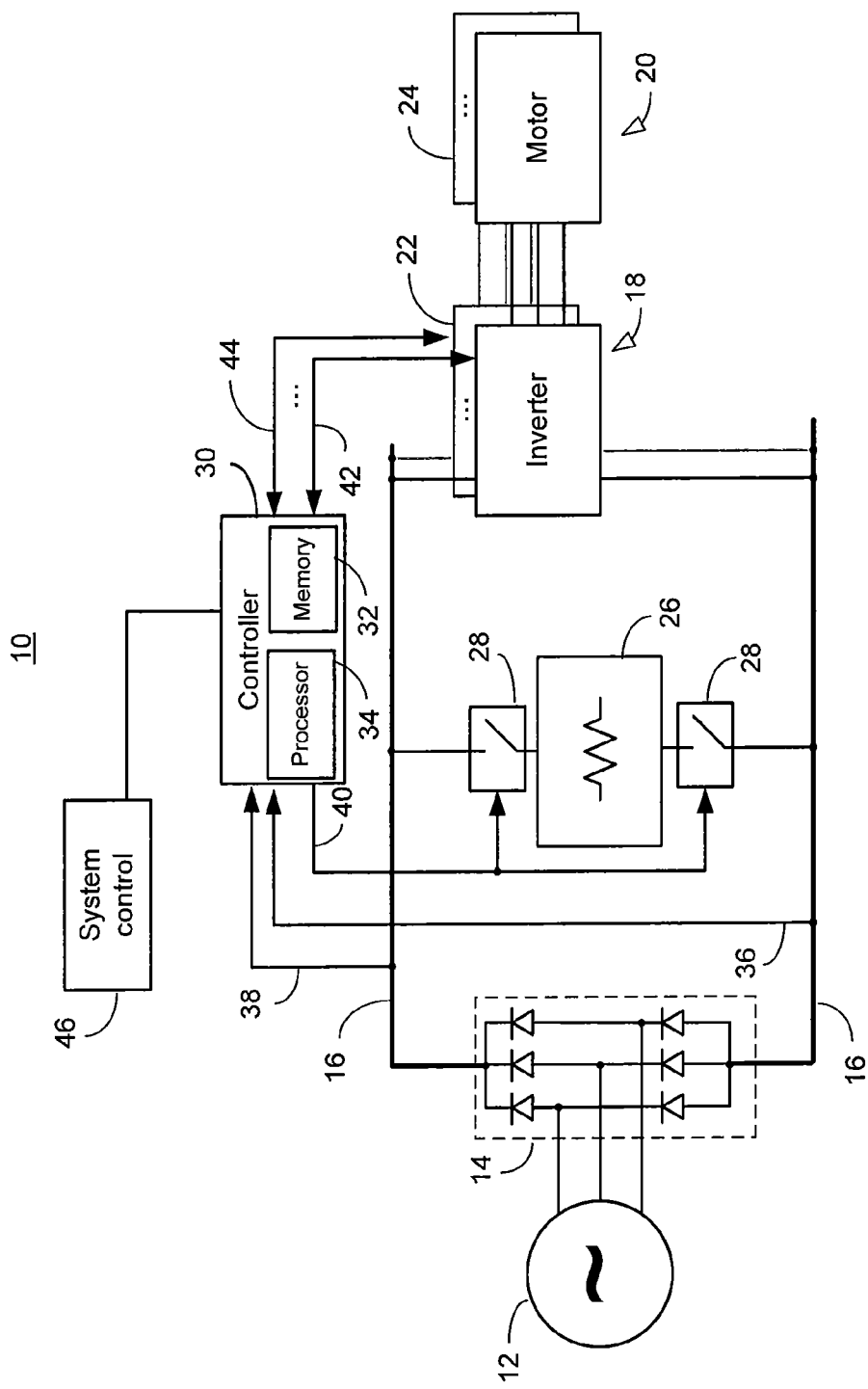
FIG. 1 is a schematic of an AC motor drive system.

FIG. 1 is a schematic of an AC motor drive system 10 suitable for use in implementing the flux estimation and motor management techniques disclosed. While the discussion following is in terms of a multi-axle or a multi-bogie locomotive, other applications where inverter-driven motors share a common DC link may benefit from this system and method.

The system 10 may include a generator 12 that provides AC power to a rectifier 14 that, in turn, generates DC power on the DC link 16. Each of a plurality of inverters 18 are coupled to the DC link 16. In a propel mode, the inverters 18 may generate three phase power to their respective motors 20 by adjusting voltage and/or phase voltage available on the DC link 16 to a respective motor phase, in a known manner. In a retard mode, or brake mode, each of the inverters 18 may return power generated by its respective motor 20 to the DC link 16, which may be dissipated in a resistive grid 26 common to each of the inverters 18. In some embodiments, each of the inverters 18 may have a separate resistive grid (not depicted).

In the case of an axle-control locomotive, there are generally six inverter-motor sets, each set driving one axle. In other embodiments, a locomotive may have fewer or more axles. In general, all the inverters 18 are coupled to the DC link 16 in common, as well as to the resistive grid 26 which may be selectively switched in or out via switches 28 under the direction of a controller 30. Special cases, particularly in that of bogie-control configurations are discussed further below. The controller 30 may include a memory 32 and a processor 34. The controller 30 may also include inputs 36, 38 from the DC link 16, a control output 40 to the grid switches 28, and control lines 42, 44 to each individual inverter of the plurality of inverters 18. The control lines 42, 44 may also include sensing feedback from the inverters for use in determining a state of each inverter, such as a back electromotive force (EMF) on the motor phases.

The controller 30 may be responsive to a higher level control system 46, such as a cab control used by an operator/engineer or an intermediate controller that translates a change in throttle position into a request for acceleration or deceleration or power, that may, in turn, be translated into a torque requirement at the controller 30. In some embodiments, the controller 30 may be physically implemented as individual controllers (not depicted), each controlling one inverter.

The memory 32 may be any combination of volatile and non-volatile memory, including rotating media, flash memory, conventional RAM, ROM or other non-volatile programmable memory, but does not include carrier waves or other propagated media.

The memory 32 may include storage for various aspects of operation of the controller 30 including various modules implementing an operating system, utilities, and operational programs, as well as short-term and long-term storage for various settings and variables used during operation.

The processor 34 may be any of a number of known computer processor architectures, including, but not limited to, single chip processors or conventional computer architectures.

In operation, when the locomotive is in propel mode, the DC link voltage is a function of the generator 12 and power on the DC link 16 is transferred to an individual motor 24 of the plurality of motors 20 via its respective inverter 22 of the plurality of inverters 18. Conversely, in brake mode, the motors 20 supply power via their respective inverters 18. During braking the, switches 28 are closed and in one embodiment, the power generated by the motors 20 is dissipated in the resistive grid 26. In braking mode, the voltage on the DC link is a function of the resistive grid and the current being output by the plurality of inverters 18. In either mode, it is important that the controller 30 have a flux reference that matches the actual motor flux because motor torque is the only setting of interest at this level of control and torque is a direct function of flux.

When a motor 24 is operating outside the "one-pulse" region, the motor voltage (the voltage between the inverter and motor) is some fraction of the DC link voltage based on a modulation ratio, allowing the inverter 22 to maintain a constant voltage at the motor 24 even with variations of the DC link voltage. However, when operating in the "one pulse" region, each inverter's modulation ratio is set to 1 and the voltage on the DC link 16 is passed directly to each of the motors 20. Therefore, there is no ability to correct for changes in DC link voltage due to load variations, generator speed, etc. Similarly, in braking mode, because the resistive grid has a fixed resistance, the DC link voltage is purely a function of the power output of the plurality of motors 20. Even though in this one-pulse region, the controller 30 cannot control motor flux, it is still necessary to have a good estimate of the actual flux so that calculations of the q-axis current reference are accurate, leading to accurate torque production.

During nominal one-pulse operation, each inverter-motor set operates virtually identically and the estimation of motor flux directly correlates to the voltage on the DC link 16. However, even in this nominal situation simply using DC link voltage for flux estimation has several problems. First, particularly during braking, the DC link voltage is directly related to the power created by the motors 20, which is directly related to the flux estimate which is used to calculate Iq, which affects torque, which by affecting power completes a control loop for DC link voltage. Because there are delays in this control loop, using the DC link voltage may lead to oscillation and instability. Second, several conditions may occur that further complicate the sole use of DC link voltage in creating a flux estimate.

One condition affecting DC link voltage is wheel slip, where the physical locomotive wheels slip on the tracks, causing, during braking, the motor to change speed and produce less power than the other motors. This unequal loading alters the DC link voltage unpredictably so that the relationship between DC link voltage and motor flux that is available during nominal operation is no longer valid.

Another condition affecting DC link voltage is inverter cut out. In some cases, either by design or due to failure, one or more inverters 18 may be turned off, also resulting in the original relationship between DC link voltage and motor flux to no longer be valid because the number of inverter-motors participating in the system 10 has changed.

A combination of feed-forward and feedback terms may be used to reduce instabilities caused by loop delays in the DC link 16 and to account for conditions such as wheel slip and inverter cut out. A valuable relationship between current, voltage, and power and the definition of flux linkage may be used to generate both the feed-forward and feedback terms.

In the following discussion, variables are defined as:

$T_{\epsilon 8}$=torque of the motor at throttle level 8,
$T_\epsilon$=torque of the motor
$T_{DB8}$=torque of the motor during dynamic braking at throttle level 8
$\omega_{mc}$=mechanical frequency of the motor at a knee frequency defined at a transition point between constant torque operation of the motor and constant power operation of the motor
$\omega_m$=mechanical frequency of the motor
$V_{DC\_TH8}$=DC link voltage in propel mode at throttle level 8
$V_{DC\_DB8}$=DC link voltage in brake mode at throttle level 8
$V_{DC}$=DC link voltage
$P_{DC}$=electrical power produced by a motor
$R_{eff}$=nominal per-inverter grid resistance
$R_{base}$=nominal per-inverter grid resistance at throttle level 8
$\eta$=motor efficiency
K=a motor constant
Flux linkage ($\lambda$) is defined in equation (1):

$$\lambda = K \cdot \frac{V_{DC}}{\omega_\epsilon} \quad (1)$$

By definition:

$$V_{DC} = K \cdot \frac{\sqrt{R_{eff} \cdot P_{DC}}}{\omega_\epsilon} \quad (2)$$

and $$P_{DC} = \eta \cdot T_\epsilon \cdot \omega_m \quad (3)$$

$$\therefore \lambda = K \cdot \frac{\sqrt{R_{eff} \cdot \eta \cdot T_\epsilon \cdot \omega_m}}{\omega_\epsilon} \quad (4)$$

Figure 2:
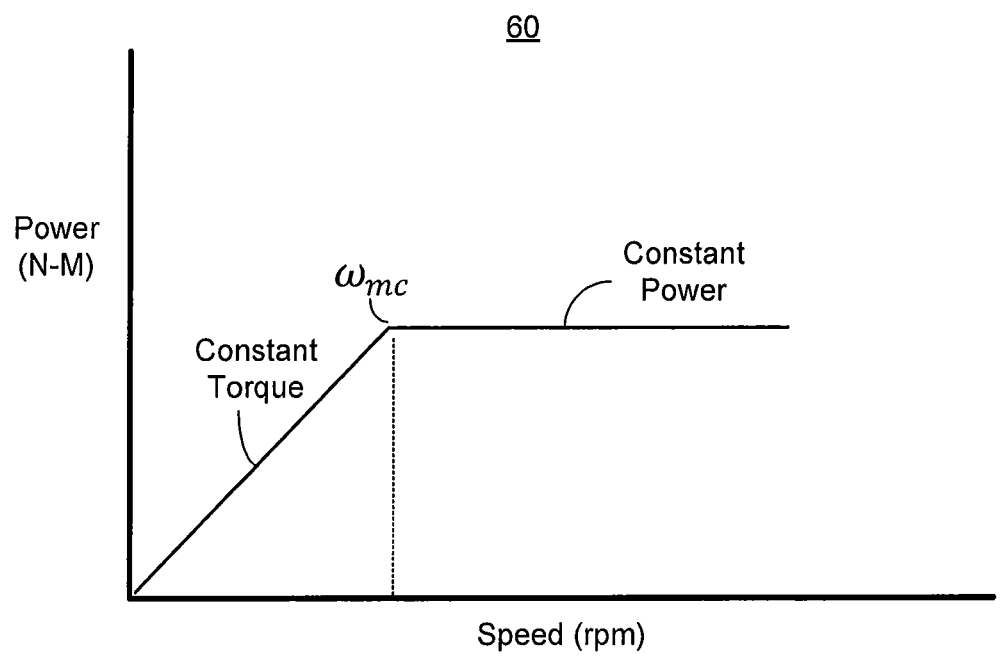
FIG. 2 is a graph of an exemplary motor power vs. speed curve.

Referring briefly to FIG. 2, for a given motor configuration, a consistent set of values may be ascertained involving a well-understood motor operating point. That condition is characterized with an individual motor 24 in drive mode at the transition point between constant torque operation and constant power operation with the throttle at maximum, known as throttle level 8. The transition point is referred to as "the knee" and occurs at a motor frequency of $\omega_{mc}$. FIG. 2 illustrates a graph 60 of speed vs. power and shows the knee at the transition between constant torque and constant power.

Feed-Forward Term

A feed forward power scale factor may be used to modify a base flux estimate that accounts for flux variations based on motor state. The actual value varies based on whether the motor is operating the constant power or constant torque region.

When operating in the constant power region, the power scale factor may be calculated as a ratio a current flux linkage divided by a nominal flux linkage at the knee.

$$\frac{\lambda}{\lambda_o} = \frac{K \cdot \frac{\sqrt{R_{eff} \cdot \eta \cdot T_\epsilon \cdot \omega_m}}{\omega_\epsilon}}{K \cdot \frac{\sqrt{R_{eff} \cdot \eta \cdot T_{\epsilon 8} \cdot \omega_{mc}}}{\omega_\epsilon}} = \sqrt{\frac{T_\epsilon \cdot \omega_m}{T_{\epsilon 8} \cdot \omega_{mc}}} \quad (5)$$

For operation in the constant torque region, where the modulation ratio is not maximized and fixed, the motor frequency terms can be ignored and the torque scale factor is represented by equation 6.

$$\frac{\lambda}{\lambda_O} = \sqrt{\frac{T_\epsilon}{T_{\epsilon 8}}} \quad (6)$$

To account for changes in the DC link voltage between drive and brake modes, a brake factor may be calculated. Referring to equation 7, below, the power of the motor in propel mode at the knee and the power in brake mode at the knee is related by the square of the ratio of the voltage in each condition.

$$T_{\epsilon 8} \cdot \omega_{mc} = T_{DB8} \cdot \omega_{mc} \cdot \left(\frac{V_{DC\_TH8}}{V_{DC\_DB8}}\right)^2 \quad (7)$$

Therefore, a brake factor constant may be developed as:

$$\left(\frac{V_{DC\_TH8}}{V_{DC\_DB8}}\right)^2 \quad (8)$$

Feedback Term

Last, using an effective resistance, that is, a resistance seen at the inverter, the impact of DC link voltage changes caused by wheel slip or inverter cut out may be accounted for.

First, observing the relationship between power in drive mode vs. brake mode, equation 7 may be used to modify equation 5, to develop the resistance scale factor of equation 9.

$$\text{Resistance Scale Factor} = \frac{\lambda}{\lambda_o} \quad (9)$$

$$= \frac{K \cdot \sqrt{\frac{R_{eff} \cdot \eta \cdot T_\varepsilon \cdot \omega_m}{\omega_\varepsilon}}}{K \cdot \frac{\sqrt{R_{base} \cdot \eta \cdot R_{\varepsilon 8} \cdot \omega_{mc}}}{\omega_\varepsilon}}$$

$$= \sqrt{\frac{R_{eff}}{R_{base}}}$$

In a purely electrical environment, power is defined as $P=I^2 \cdot R$ where I=current and R is resistance. However, in the AC motor environment of an exemplary embodiment, motor current is not measured, primarily because of the impact of placing a current sensor in the drive circuit. An alternate form of the power equation is $$P = \frac{V^2}{R},$$

where V is voltage, and therefore, $$R = \frac{V^2}{P}.$$

Advantageously, the power of the motor 24 may be calculated from the known quantities torque and motor frequency. A base resistance associated with throttle level 8 conditions may be calculated and used as a constant, see, e.g., equation 10. The effective resistance can also be determined using the measured voltage and motor frequency, as illustrated in equation 11.

$$R_{base} = \frac{V^2_{DC\_DB8}}{\eta \cdot T_{DB8} \cdot \omega_m} \quad (10)$$

$$R_{eff} = \frac{V^2_{DC}}{\eta \cdot T_{DB8} \cdot \omega_m} \quad (11)$$

The resistance scale factor may then be restated in terms of parameters available to the controller 30 and the constant $R_{base}$. Even though electrical power is related to motor power by a motor efficiency factor $\eta$ (see, e.g., equation 3 above), by assuming that motor efficiency is constant, the motor efficiency term drops out of the following equation.

$$\text{Resistance Scale Factor} = \sqrt{\frac{R_{eff}}{R_{base}}} = \sqrt{\frac{V^2_{DC}/(T_\varepsilon \cdot \omega_m)}{R_{base}}} \quad (12)$$

At very low speeds, where it is expected that the DC link voltage will be supported solely by the generator 12, the resistance scale factor may be clamped to unity.

CONCLUSION

The use of the brake factor, the resistance factor, and either the power factor or torque factor accommodate flux estimation for each operating condition as follows:

For normal balanced loading, with all inverters online and all grid paths active: the resistance scale factor is unity and either the power scale factor or the torque scale factor adjust a nominal flux value to follow DC link voltage, where the appropriate scale factor is selected based on motor operating point.

For balanced loading with one inverter cut out and all grid paths active: with fewer inverters producing power, a normal torque request to an inverter will result in less total system power and lower DC link voltage. In this situation the resistance scale factor is less than one, providing the desired reduction in flux to correspond to the lower DC link voltage for the normal torque request.

For balanced loading with two inverters cut out and one grid path active: in this situation there are more inverters active per grid path than normal, so a normal torque request to each inverter results in a higher-than-normal DC link voltage. As a result, the resistance scale factor is greater than one, providing the desired increase in flux reference to correspond to the higher DC link voltage for the normal torque request.

For all inverters online, with different loading between all inverters due to, for example, wheel slip: for the light-loading inverters the DC link voltage will appear artificially high, which will cause the resistance scale factor to go up, boosting flux appropriately to match the available voltage; and for the heavier-loading inverters the DC link voltage will appear artificially low, which will cause the resistance scale factor to go down, cutting flux to match the available voltage.

OTHER EMBODIMENTS

In bogie control applications where each inverter operates with an isolated DC links, the torque reference is all that is needed for flux estimation because there is a one-to-one relationship of torque and speed to DC link voltage. On a bogie control locomotive with non-isolated DC links there are two inverters and two grid paths so that if one inverter is cut out one grid path is also disabled. So, the instant system and method will address normal and inverter cut out operation. However, the disclosed system may not properly account for non-isolated DC link bogie control situation where both inverters are online but not equally loaded, such as when one inverter is unloaded due to wheel slip.

Figure 3:
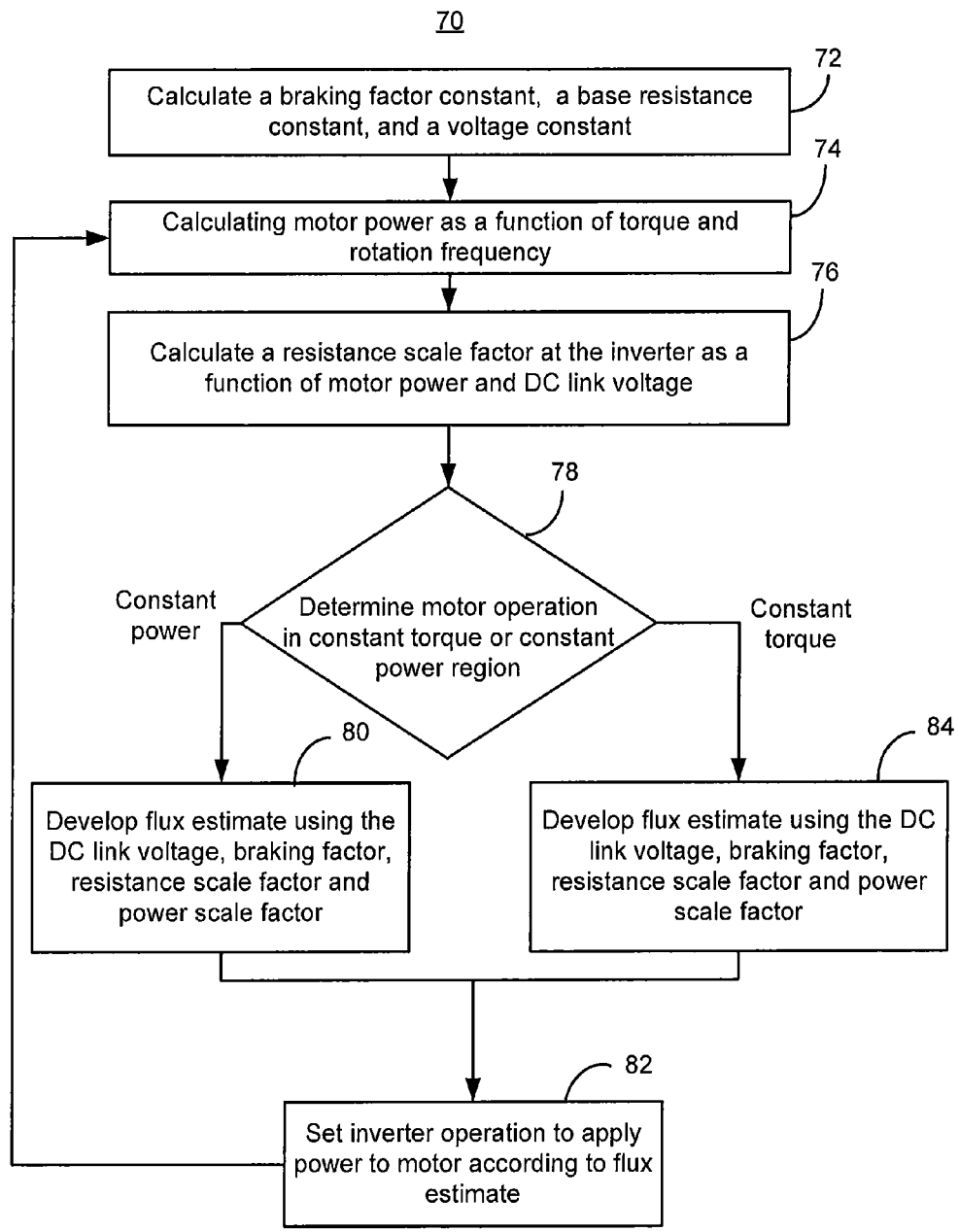
FIG. 3 is a flowchart of an exemplary method operating an AC motor driven by an inverter.

FIG. 3 illustrates a method 70 of adjusting application of electrical power in a motor drive system 10 using an AC motor 24 driven by an inverter 22 that is coupled to a resistive grid 26 during retard operation.

At a block 72, a braking factor may be calculated as a ratio of a nominal power DC voltage vs. a nominal brake DC voltage, see, e.g., equation 8.

A base resistance constant may also be calculated using characteristics of the motor 24 at a first motor rotation frequency, where the first motor rotation frequency defines a transition between a constant torque operation of the motor 24 and a constant power operation of the motor 24 ("the knee frequency"), see, e.g., equation 10. Further, a voltage constant may be calculated as a ratio between a DC link voltage in a propel mode at throttle level 8 at the knee frequency and a DC link voltage in a brake mode at throttle level 8 at the knee frequency, see, e.g. equation 7.

At a block 74, a motor power may be calculated as a function of the actual torque and an actual motor rotation frequency, see, e.g., equation 3.

At a block 76, a resistance scale factor may be calculated as a ratio of measured grid effective resistance vs. a base grid resistance, where the effective resistance at the inverter is a function of motor power and a DC link voltage, see, e.g., equation 11.

At a block 78, a determination may be made that motor operation is in either a constant power region or a constant torque region as described above with respect to FIG. 2. In general, this determination may be made by the controller 30 based on motor frequency using known motor characteristics and the controller's knowledge of a current operating condition of the motor 20.

When motor operation is in a constant power region, execution may continue at a block 80 where a nominal flux estimate may be multiplied with a DC link voltage, the braking factor, the resistance scale factor, and a power scale factor to generate an adjusted flux estimate. As discussed above, the resistance scale factor is a function of the effective resistance and the base resistance constant, see, e.g., equation 11 and the power scale factor is a function of a measured torque times mechanical frequency, see, e.g., equation 5.

At a block 82, inverter operation may be set to adjust motor torque based on the adjusted flux estimate.

When, at block 78, motor operation is in a constant torque region, execution may continue at a block 84, where a nominal flux estimate may be multiplied with a DC link voltage, the braking factor, the resistance scale factor, and a torque scale factor to generate an adjusted flux estimate. The torque scale factor is a function of a measured torque, see, e.g., equation 6. Execution may then continue at block 82 as described above.

From the block 82, the process may continue by returning to the block 74 and proceeding as described above.

INDUSTRIAL APPLICABILITY

In general, applications using AC motors driven by inverters may benefit from the techniques described above. More particularly, railroad locomotives using individual axle control or bogie control with non-isolated DC links may see an increase in efficiency and power control accuracy as a result of improved flux estimation, particularly during braking. Because locomotives are subject to unpredictable real-world situations such as inverter cut-out and wheel slip, the ability to arrive at a correct flux estimate provides a level of control not found in the prior art.

The current increase in commercial railroad traffic combined with ongoing efforts to improve efficiency and environmental friendliness create a climate where motor torque management and therefore the control of motor power output are at a premium. The flux estimation techniques described above provide an additional resource for use in meeting these demands.

What is claimed is:

1. A method of adjusting electrical power application in a motor control system using an AC motor driven by an inverter bank that is coupled to a resistive grid during retard operation, the method comprising:
   calculating a braking factor as a ratio of a nominal power DC voltage vs. a nominal brake DC voltage;
   calculating a resistance scale factor as a ratio of measured grid resistance vs. a base grid resistance;
   determining that motor operation is in one of a constant power region or a constant torque region;
   multiplying a DC link voltage, the braking factor, the resistance scale factor and one of a power scale factor when in a constant power region or a torque scale factor when in a constant torque region to generate an adjusted flux estimate; and
   setting inverter operation to adjust motor torque based on the adjusted flux estimate, wherein the power scale factor is a function of a measured torque times mechanical frequency vs. a characteristic torque times a corner point mechanical frequency and the torque scale factor is a function of the measured torque vs. the characteristic torque.

2. The method of claim 1, wherein the braking factor is calculated as $$\left(\frac{V_{DC\_TH8}}{V_{DC\_DB8}}\right)^2,$$

where $V_{DC\_TH8}$=DC link voltage in propel mode at throttle level 8, and $V_{DC\_TH8}$=DC link voltage in brake mode at throttle level 8.

3. The method of claim 1, wherein the resistance scale factor is calculated as $$\sqrt{\frac{V_{DC}^2/(T_\varepsilon \cdot \omega_m)}{V_{DC\_DB8}^2/(T_{DB8} \cdot \omega_m)}},$$

where $T_\varepsilon$=torque of the motor, $T_{DB8}$=torque of the motor during dynamic braking at throttle level 8, $\omega_m$=mechanical frequency of the motor, $V_{DC\_DB8}$=DC link voltage in brake mode at throttle level 8 and $V_{DC}$=DC link voltage.

4. The method of claim 1, wherein the power scale factor is calculated as $$\sqrt{\frac{T_\varepsilon \cdot \omega_m}{T_{\varepsilon 8} \cdot \omega_{mc}}},$$

where $T_{\varepsilon 8}$=torque of the motor at throttle level 8, $T_\varepsilon$=torque of the motor, $\omega_m$=mechanical frequency of the motor, $\omega_{mc}$=mechanical frequency of the motor at a knee frequency defined at a transition point between constant torque operation of the motor and constant power operation of the motor.

5. The method of claim 1, wherein the torque scale factor is calculated as $$\sqrt{\frac{T_\varepsilon}{T_{\varepsilon 8}}},$$

where $T_{\varepsilon 8}$=torque of the motor at throttle level 8, $T_\varepsilon$=torque of the motor.

6. The method of claim 2, wherein the resistance scale factor is calculated as a square root of effective resistance divided by a base resistance defined by the equation:

$$\sqrt{\frac{V_{DC}^2/(T_\varepsilon \cdot \omega_m)}{V_{DC\_DB8}^2/(T_{DB8} \cdot \omega_{mc})}},$$

where $T_\varepsilon$=torque of the motor, $T_{DB8}$=torque of the motor during dynamic braking at throttle level 8, $\omega_m$=mechanical frequency of the motor, $\omega_{mc}$=mechanical frequency of the motor at a knee frequency defined at a transition point between constant torque operation of the motor and constant power operation of the motor, $V_{DC\_DB8}$=DC link voltage in brake mode at throttle level 8 and $V_{DC}$=DC link voltage.

7. The method of claim 6, wherein the power scale factor is calculated as $$\sqrt{\frac{T_\varepsilon \cdot \omega_m}{T_{\varepsilon 8} \cdot \omega_{mc}}},$$

where $T_{\varepsilon 8}$=torque of the motor at throttle level 8.

8. The method of claim 7, wherein the torque scale factor is calculated as $$\sqrt{\frac{T_\varepsilon}{T_{\varepsilon 8}}}.$$

9. A method of operating an AC motor driven by an inverter, the method comprising:
determining a base resistance constant using characteristics of the motor at a first motor rotation frequency, the first motor rotation frequency defined at a transition point between constant torque operation of the motor and constant power operation of the motor ("the knee frequency");
calculating motor power as a function of the actual torque and the actual motor rotation frequency;
calculating an effective resistance at the inverter as a function of motor power and a voltage on the DC link;
calculating an estimated flux reference as a function of the DC link voltage, the effective resistance, and the base resistance constant; and
adjusting torque output of the motor based on the estimated flux reference.

10. The method of claim 9, further comprising:
calculating a voltage constant as a ratio between a DC link voltage in a propel mode at throttle level 8 at the knee frequency and a DC link voltage in a brake mode at throttle level 8 at the knee frequency,
wherein calculating the estimated flux reference includes calculating the estimated flux reference as a further function of the voltage constant.

11. The method of claim 10, further comprising:
determining that the AC motor is operating in a constant power region; and
calculating a first scaling factor when the motor operation is in the constant torque region, wherein calculating the estimated flux reference includes calculating the estimated flux reference as a further function of the first scaling factor.

12. The method of claim 11, wherein calculating the first scaling factor comprises calculating $$\sqrt{\frac{T_\varepsilon \cdot \omega_m}{T_{\varepsilon 8} \cdot \omega_{mc}}},$$

where $T_\varepsilon$=torque of the motor, $T_{\varepsilon 8}$=torque of the motor at throttle level 8, $\omega_m$=mechanical frequency of the motor, $\omega_{mc}$=the knee frequency.

13. The method of claim 10, further comprising:
determining that the AC motor is operating in a constant torque region; and
calculating a second scaling factor when the motor operation is in the constant torque region, wherein calculating the estimated flux reference includes calculating the estimated flux reference as a further function of the second scaling factor.

14. The method of claim 13, wherein calculating the second scaling factor comprises calculating $$\sqrt{\frac{T_\varepsilon}{T_{\varepsilon 8}}}.$$

15. The method of claim 14, wherein determining the base resistance constant comprises:
determining a value for $V_{DC\_DB8}$=DC link voltage in brake mode at throttle level 8;
determining a value for $T_{DB8}$=torque of the motor during dynamic braking at throttle level 8;
determining a value for $\omega_{mc}$=mechanical frequency of the motor at the knee frequency, and
calculating the base resistance constant as $R_{base}=V_{DC\_DB8}^2/\eta \cdot T_{DB8} \cdot \omega_m$.

16. The method of claim 15, wherein calculating the effective resistance comprises calculating $$\sqrt{\frac{V_{DC}^2/(T_\varepsilon \cdot \omega_m)}{R_{base}}}.$$

17. An alternating current (AC) motor system adapted to adjust motor flux based on motor power, a direct current (DC) link voltage and an effective resistance at an inverter used to drive the AC motor, the system comprising:
an AC generator;
a rectifier that converts an output of the generator to DC power;
a DC link coupled to the rectifier;
a resistive grid selectively coupled to the DC link;
a plurality of AC motors;
a plurality of inverters, each of the plurality of inverters electrically coupling the DC link to a respective one AC motor of the plurality of AC motors;
a controller coupled to the DC link, the resistive grid, and each of the plurality of inverters, the controller including:
a processor; and
a memory storing instructions that when executed on the processor cause the controller to:
calculate an estimated flux based at least in part on an effective resistance of the grid at each inverter of the plurality of inverters, the effective resistance calculated from actual torque, actual motor rotation frequency, the DC link voltage and a base resistance constant; and
adjust a setting for each inverter of the plurality of inverters that controls a torque of the AC motor associated with each inverter.

18. The AC motor system of claim 17, wherein the memory stores further instructions that when executed on the processor cause the controller to:
calculate a resistance scale factor based on the effective resistance the resistance scale factor defined as $$\sqrt{\frac{V_{DC}^2/(T_\varepsilon \cdot \omega_m)}{V_{DC\_DB8}^2/(T_{DB8} \cdot \omega_m)}},$$

where $T_\varepsilon$=torque of the motor, $T_{DB8}$=torque of the motor during dynamic braking at throttle level 8, $\omega_m$=mechanical frequency of the motor, $V_{DC\_DB8}$=DC link voltage in brake mode at throttle level 8, and $V_{DC}$=DC link voltage, the resistance scale factor used to calculate the estimated flux.

19. The AC motor system of claim 17, wherein the memory stores further instructions that when executed on the processor cause the controller to:
use an additional factor to calculate the estimated flux defined as a power scale factor calculated as $$\sqrt{\frac{T_\varepsilon \cdot \omega_m}{T_{\varepsilon 8} \cdot \omega_{mc}}},$$

where $T_{\varepsilon 8}$=torque of the motor at throttle level 8, $T_\varepsilon$=torque of the motor, $\omega_m$=mechanical frequency of the motor, $\omega_{mc}$=mechanical frequency of the motor at a knee frequency defined at a transition point between constant torque operation of the motor and constant power operation of the motor, the power scale factor used when the AC motor is in a constant power region of operation.

20. The AC motor system of claim 17, wherein the memory stores further instructions that when executed on the processor cause the controller to:
use an additional factor to calculate the estimated flux defined as a torque scale factor calculated as $$\sqrt{\frac{T_\varepsilon}{T_{\varepsilon 8}}},$$

where $T_{\varepsilon 8}$=torque of the motor at throttle level 8, $T_\varepsilon$=torque of the motor, $\omega_m$=mechanical frequency of the motor, the torque scale factor used when the AC motor is in a constant torque region of operation.

* * * * *